United States Patent
Bradley et al.

(10) Patent No.: US 12,443,054 B2
(45) Date of Patent: Oct. 14, 2025

(54) MYOPIA-CONTROL CONTACT LENSES AND METHODS RELATING THERETO

(71) Applicant: CooperVision International Limited, Fareham (GB)

(72) Inventors: Arthur Bradley, Bloomington, IN (US); Martin Webber, Southampton (GB); Paul Chamberlain, Livermore, CA (US); Baskar Arumugam, Dublin, CA (US); David S. Hammond, Pleasanton, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 432 days.

(21) Appl. No.: 18/097,295

(22) Filed: Jan. 16, 2023

(65) Prior Publication Data

US 2023/0236439 A1 Jul. 27, 2023

Related U.S. Application Data

(60) Provisional application No. 63/301,650, filed on Jan. 21, 2022.

(51) Int. Cl.
*G02C 7/04* (2006.01)

(52) U.S. Cl.
CPC ......... *G02C 7/049* (2013.01); *G02C 2202/20* (2013.01); *G02C 2202/22* (2013.01); *G02C 2202/24* (2013.01)

(58) Field of Classification Search
None
See application file for complete search history.

(56) References Cited

U.S. PATENT DOCUMENTS

| | | | |
|---|---|---|---|
| 2006/0082729 A1* | 4/2006 | To | G02B 5/1895 351/159.06 |
| 2007/0159601 A1 | 7/2007 | Ho et al. | |
| 2008/0218687 A1 | 9/2008 | Phillips | |
| 2010/0312336 A1 | 12/2010 | Hong et al. | |
| 2010/0312337 A1* | 12/2010 | Zhang | A61F 2/1654 623/6.31 |

(Continued)

FOREIGN PATENT DOCUMENTS

| | | |
|---|---|---|
| JP | 2008250316 A | 10/2008 |
| TW | 200801636 A | 1/2008 |

(Continued)

OTHER PUBLICATIONS

International Search Report and Written Opinion issued in corresponding International Patent Application No. PCT/GB2023/050125 mailed May 2, 2023 (18 pages).

(Continued)

*Primary Examiner* — Darryl J Collins
(74) *Attorney, Agent, or Firm* — Kilyk & Bowersox, P.L.L.C.

(57) ABSTRACT

An ophthalmic lens (112', 200) for use in preventing or slowing the development or progression of myopia comprises an optic zone (202) for focusing light from distant point objects to a focal surface. The optic zone comprises a diffractive lens (206) for manipulating the longitudinal chromatic aberration properties of the light proximate the focal surface.

22 Claims, 10 Drawing Sheets

(56) References Cited

U.S. PATENT DOCUMENTS

| | | |
|---|---|---|
| 2011/0149236 A1 | 6/2011 | Weeber |
| 2020/0073147 A1 | 3/2020 | Bakaraju et al. |
| 2021/0018762 A1* | 1/2021 | Zheleznyak ............ G02C 7/042 |
| 2022/0155615 A1* | 5/2022 | Iguchi .............. B29D 11/00326 |
| 2022/0244573 A1 | 8/2022 | Matsuoka et al. |
| 2022/0350169 A1* | 11/2022 | Sankaridurg ........... G02C 7/024 |

FOREIGN PATENT DOCUMENTS

| | | |
|---|---|---|
| WO | 2014033543 A2 | 3/2014 |
| WO | 2018152595 A1 | 8/2018 |
| WO | 2020261213 A1 | 12/2020 |
| WO | 2021059672 A1 | 4/2021 |
| WO | 2021124218 A1 | 6/2021 |

OTHER PUBLICATIONS

Atchison et al., "Chromatic dispersions of the ocular media of human eyes," Journal of the Optical Society of America A, Jan. 2005, vol. 22, No. 1, pp. 29-37.
Office Action issued in corresponding Taiwan Patent Application No. 112102199 issued Aug. 10, 2023 (with English translation)(20 pages).
PCT Demand filed Nov. 20, 2023 in corresponding International Patent Application No. PCT/GB2023/050125 (17 pages).
PCT Second Written Opinion of the Int'l Preliminary Examining Authority dated Dec. 11, 2023 in corresponding International Patent Application No. PCT/GB2023/050125 (7 pages).
Response to Second Written Opinion filed Feb. 9, 2024 in corresponding International Patent Application No. PCT/GB2023/050125 (11 pages).
International Preliminary Report on Patentability issued in corresponding International Patent Application No. PCT/GB2023/050125 dated Apr. 26, 2024 (36 pages).
Search and Examination Report issued in corresponding United Kingdom Patent Application No. 2300870.9 dated Jul. 19, 2023 (8 pages).
Office Action issued in corresponding Japanese Patent Application No. 2024-542308 issued Jul. 1, 2025 (9 pages).

* cited by examiner

MYOPIA-CONTROL CONTACT LENSES AND METHODS RELATING THERETO

This application claims the benefit under 35 U.S.C. § 119(e) of prior U.S. Provisional Patent Application No. 63/301,650, filed Jan. 21, 2022, which is incorporated in its entirety by reference herein.

TECHNICAL FIELD

The present disclosure concerns ophthalmic lenses for use in preventing or slowing the development or progression of myopia. The present disclosure also concerns methods of manufacturing such lenses and methods of using such lenses.

BACKGROUND

Myopia (short-sightedness) affects a significant number of people including children and adults. Myopic eyes focus incoming light from distant objects to a location in front of the retina. Consequently, the light diverges towards, and is out of focus upon arrival at the retina. Conventional lenses (e.g. spectacle lenses and contact lenses) for correcting myopia cause divergence of incoming light from distant objects before it reaches the eye, so that the location of the focus is shifted onto the retina.

It was suggested several decades ago that progression of myopia in children or young people could be slowed or prevented by under-correcting, i.e. moving the focus towards but not quite onto the retina. However, that approach necessarily results in degraded distance vision compared with the vision obtained with a lens that fully corrects for any myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. It has been suggested that this approach can prevent or slow down the development or progression of myopia in children or young people, whilst providing good distance vision. The regions that provide full-correction of distance vision are usually referred to as base-power regions and the regions that provide under-correction or deliberately induce myopic defocus are usually referred to as add-power regions or myopic defocus regions (because the dioptric power is more positive, or less negative, than the power of the distance regions).

A surface (typically the anterior surface) of the add-power region(s) has a smaller radius of curvature than that of the distance power region(s) and therefore provides a more positive or less negative power to the eye. The add-power region(s) are designed to focus incoming parallel light (i.e. light from a distance) within the eye in front of the retina (i.e. closer to the lens), whilst the distance power region(s) are designed to focus light and form an image at the retina (i.e. further away from the lens).

Another type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e. the base power) for viewing both distant objects and near objects. The treatment zones of the dual-focus lens that have the add-power also provide a myopically defocused image at both distant and near viewing distances.

Whilst these lenses have been found to be beneficial in preventing or slowing down the development or progression of myopia, annular add-power regions can give rise to unwanted visual side effects. Light that is focused by the annular add-power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e. the eye's natural ability to change focal length) to bring nearby objects into focus, wearers can make use of the additional focus in front of the retina that results from the annular add-power region; in other words, wearers can inadvertently use the lenses in the same manner as presbyopia correction lenses are used, which is undesirable for young subjects.

The present disclosure provides improved lenses for use in young subjects that prevent or slow worsening of myopia.

SUMMARY

The present disclosure provides, according to a first aspect, an ophthalmic lens for use in preventing or slowing the development or progression of myopia. The ophthalmic lens comprises an optic zone for focusing light from distant point objects to a focal surface. The optic zone comprises a diffractive lens for manipulating the longitudinal chromatic aberration properties of the light proximate the focal surface. The ophthalmic lens may be a contact lens.

The present disclosure provides, according to a second aspect, a method of manufacturing an ophthalmic lens according to the first aspect.

The present disclosure provides, according to a third aspect, a method of reducing progression of myopia. The method comprises providing an ophthalmic lens according to the first aspect to a myopic person who is able to accommodate for varying near distances.

The present disclosure provides, according to a fourth aspect an ophthalmic lens for use in preventing or slowing the development or progression of myopia. The ophthalmic lens comprises an optic zone comprising an annular region and a central region. The central region comprises a diffractive lens for manipulating the longitudinal chromatic aberration properties of the light. The annular region has a relatively greater optical power than the base power of the central region. Optionally, the annular region may also comprise a diffractive lens for manipulating the longitudinal chromatic aberration properties of the light.

It will of course be appreciated that features described in relation to one aspect of the present disclosure may be incorporated into other aspects of the present disclosure. For example, the method of the disclosure may incorporate features described with reference to the apparatus of the disclosure and vice versa.

DETAILED DESCRIPTION

Figure 1A:
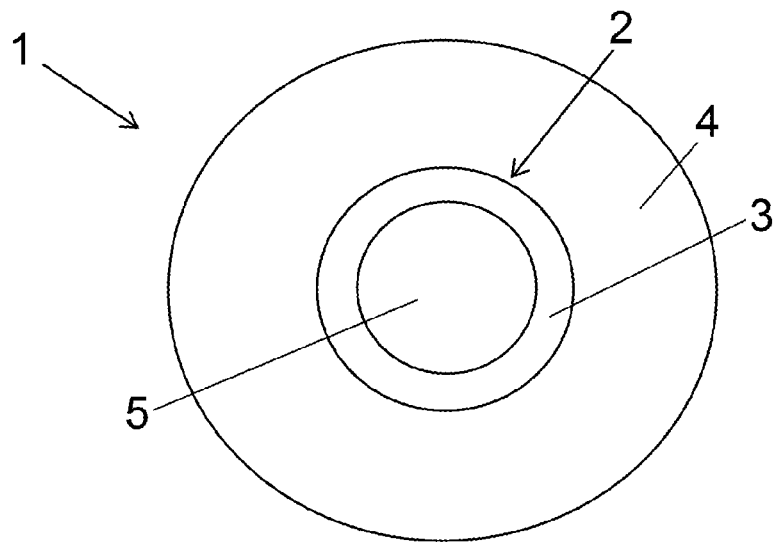
FIG. 1A is a schematic top view of a prior art contact lens for use in the prevention of myopia.
Figure 1B:
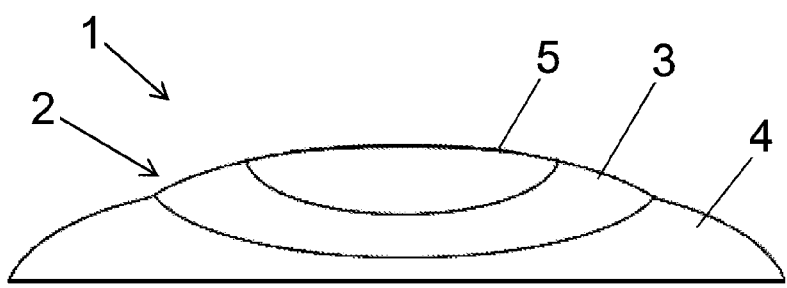
FIG. 1B is a schematic side view of the contact lens of FIG. 1A.
Figures 2A, 2B, 2C:
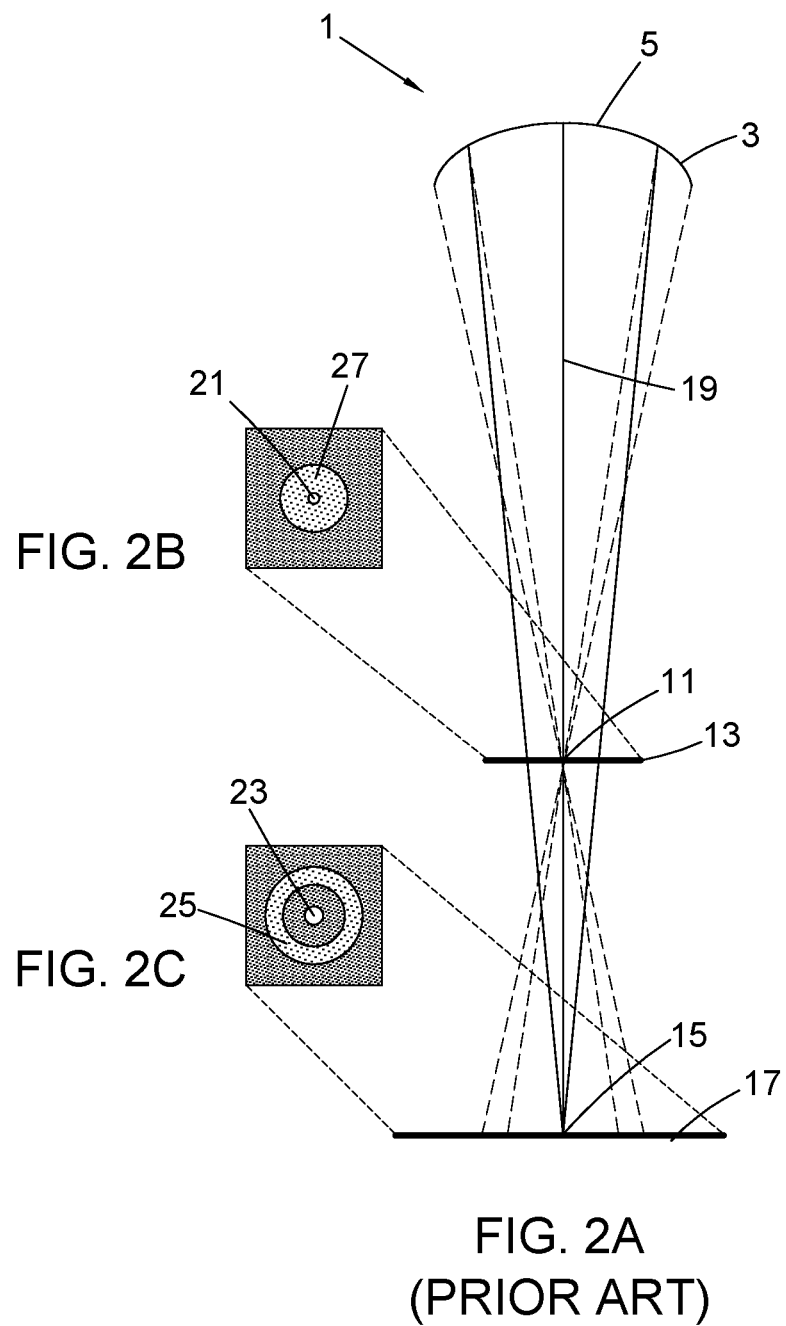
FIG. 2A is a schematic ray diagram for the lens of FIG. 1A.
FIG. 2B shows a light pattern at a proximal focal surface of the lens of FIG. 1A formed from a distant point source.
FIG. 2C shows a light pattern at a distal focal surface of the lens of FIG. 1A formed from a distant point source.

FIG. 1A shows a schematic top view of a prior art lens for use in the slowing progression of myopia (e.g., myopia control). The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, providing ballasting to prevent rotation of the lens 1, and providing a shaped region that improves comfort for the lens 1 wearer. The optic zone 2 provides the optical functionality of the lens 1, and the optic zone comprises an annular region 3 and a central region 5. This lens 1 has a positive base power, and the radius of curvature of the anterior surface of the annular region 3 is smaller than the radius of curvature of the anterior surface of the central region 5. (This is shown in an exaggerated schematic form in FIG. 1B and in the corresponding ray diagram of FIG. 2A). The annular region 3 therefore has a greater power than the base power of the central region 5. The focus 11 of the annular region 3 lies on a proximal focal surface 13, and the focus 15 for the central region 5 lies on a distal focal surface 17, which is further away from the posterior surface of the lens 1. The focus 11 of the annular region 3 and the focus 15 of the central region 5 share a common optical axis 19. As shown in FIG. 2B and FIG. 2C, for a point source at infinity, light rays focused by the central region 5 form a focused image 23 at the distal focal surface 17. Light rays focused by the central region 5 also produce an unfocused blur spot 27 at the proximal focal surface 13. Light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17.

As discussed above, the unfocused annulus image 25 may result in wearers of the lens 1 seeing a 'halo' around focused distance images. Furthermore, wearers can inadvertently use the lenses in the same manner as presbyopia correction lenses are used, which is undesirable for young subjects. Accordingly, the present disclosure provides an improved lens for use in the slowing progression of myopia.

By way of background, there is considerable evidence that conditions of hyperopic defocus activate accommodation to refocus the eye. A larger magnitude of defocus at long wavelengths than at short wavelengths indicates that the image plane for the visually significant central part of the visible spectrum (green light) lies behind the retina, resulting in hyperopic defocus. The eye will increase its accommodation in response to this so-called chromatic blur signal/pattern, even if doing so actually increases overall image blur. This evidence indicates that the chromatic blur signal/pattern is an important factor in accommodation control.

Figure 3A:
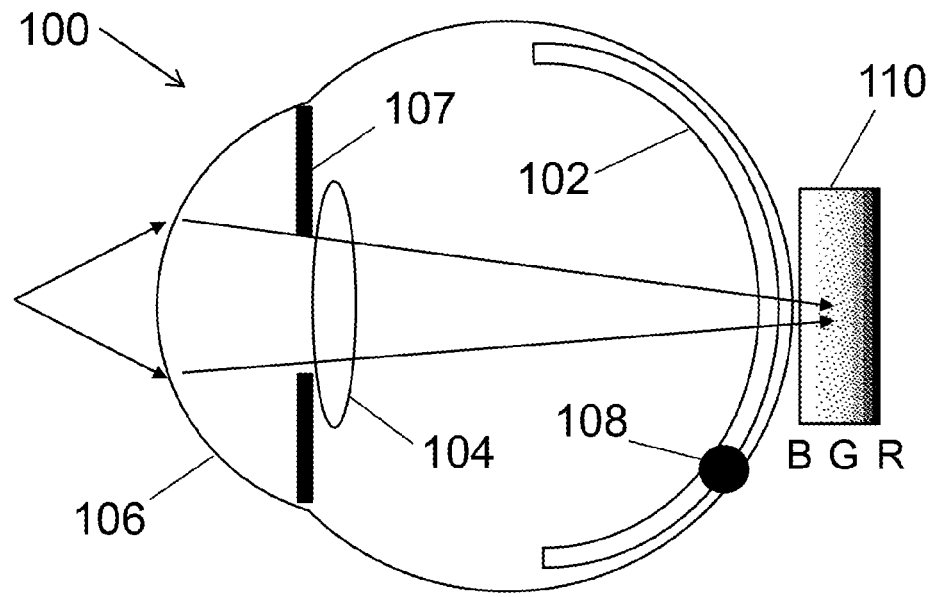
FIG. 3A is a schematic view of a hyperopic human eye or an emmetropic eye under conditions of accommodative lag.

FIG. 3A is a schematic view of a hyperopic eye 100 (or an emmetropic eye with accommodative lag). The eye 100 comprises a retina 102, an adjustable crystalline lens 104, a cornea 106, an iris 107 and an optic nerve 108. Due to longitudinal chromatic aberration caused by the natural materials present in the eye, different wavelengths of light come to focus at different longitudinal positions relative to the retina 102, i.e. at different longitudinal positions along the effective optical axis of the eye. This effect is represented schematically in FIG. 3A by means of the chromatic light distribution 110. In the hyperopic eye 100 (or in the emmetropic eye with accommodative lag), the different wavelengths of light tend to come to focus behind the retina, with blue light (represented by "B") coming to focus closer to the retina than green light (represented by "G"), which in turn comes to focus closer to the retina than red light (represented by "R"). Accordingly, under conditions of hyperopic defocus, as shown in FIG. 3A, the blue light portion of the image will appear more focussed than the red light portion. This chromatic blur signal/pattern (red light more defocussed than blue light) is indicative of a hyperopic defocus.

Figure 3B:
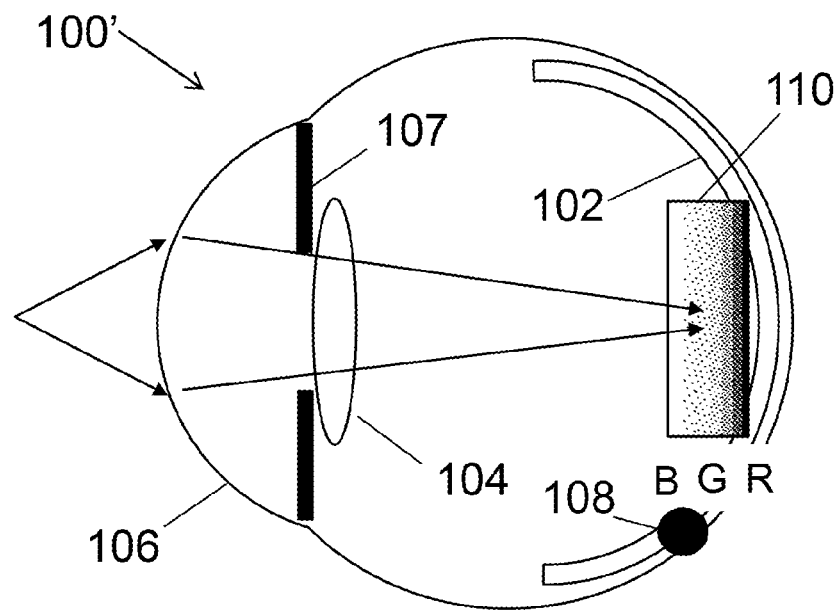
FIG. 3B is a schematic view of a myopic human eye.

FIG. 3B is a schematic view of a myopic eye 100'. Again, due to longitudinal chromatic aberration caused by the natural materials present in the eye, different wavelengths of light come to focus at different longitudinal positions relative to the retina 102. However, for the myopic eye 100', the chromatic distribution 110 generally lies in front of the retina. As such, blue light (represented by "B") comes to focus further from the retina than green light (represented by "G") which in turn comes to focus further from the retina than red light (represented by "R"). Accordingly, under conditions of myopic defocus, blue light will appear less focussed than red light, which is the chromatic blur signal/pattern indicative of a myopic defocus.

Figure 4:
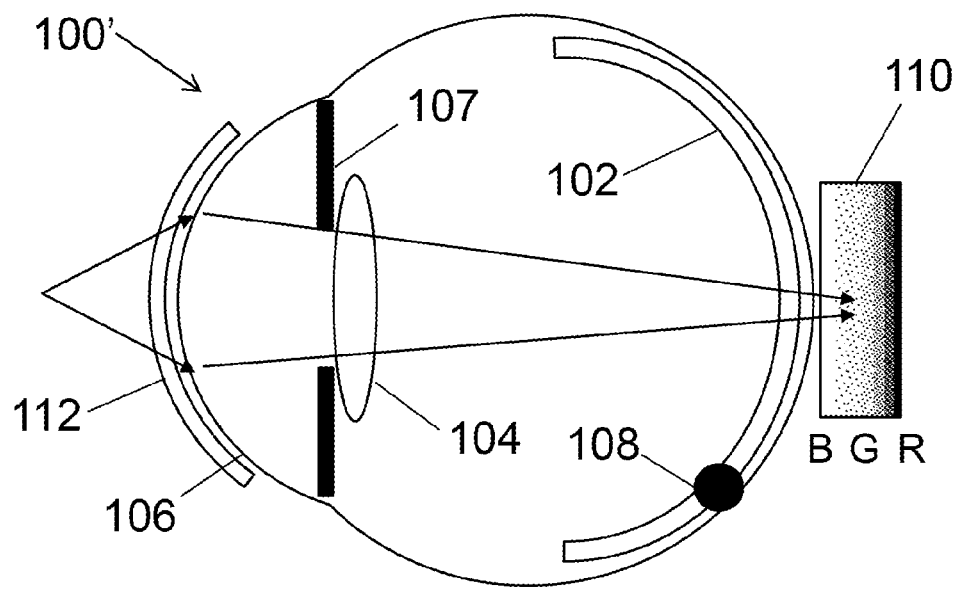
FIG. 4 is a schematic view of a myopic human eye wearing a conventional contact lens which is intended to correct for myopia, where the myopic eye is focusing on a near target and is under conditions of accommodative lag.

FIG. 4 is a schematic view of a myopic eye 100' wearing a conventional contact lens 112 which is intended to correct for myopia and hence enable the eye to focus at distance. In FIG. 4, the eye 100' is shown in a state of viewing a near target, as opposed to a distant target. Due to accommodative lag (either temporary or persistent) hyperopic defocus is present. This mimics the conditions present within the hyperopic eye 100, shown in FIG. 3A. Accordingly, this condition leads to a chromatic blur signal/pattern which is characteristic of hyperopia/hyperopic defocus, despite the eye actually being optically corrected for myopia using conventional contact lenses. Because of this particular chromatic blur signal being present, a so-called 'grow' signal will occur in the subject who is wearing the lens. This is undesirable, since it can lead to a worsening of the already present myopia in the subject.

Figure 5A:
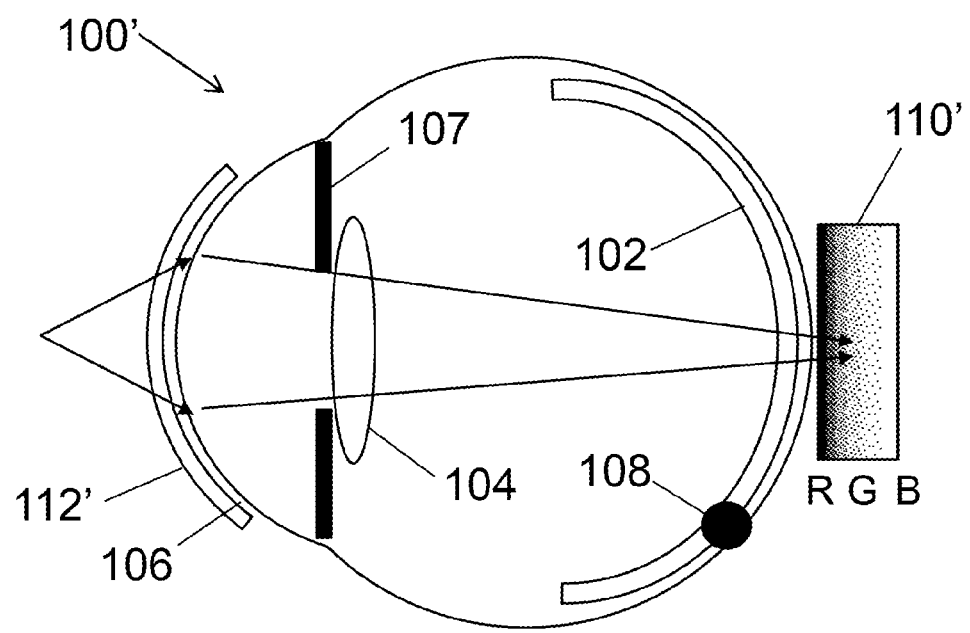
FIG. 5A is a schematic view of a myopic human eye wearing a contact lens for use in preventing or slowing the development or progression of myopia according to an embodiment of the present disclosure in which the contact lens has a diffractive optical element causing a reversal of chromatic blur.

With the above discussion in mind, FIG. 5A is a schematic view of a myopic eye 100' wearing a contact lens 112' of a type according to embodiments of the present disclosure. As with FIG. 4, the myopic eye 100' is shown in a state of viewing a near target under conditions of accommodative lag. Accordingly, as with FIG. 4, hyperopic defocus is present (i.e. the light from the target comes to a focus behind the plane of the retina). However, in contrast to the situation shown in FIG. 4, the contact lens 112' manipulates the longitudinal chromatic aberration properties of the light in such a manner as to provide reversal of the chromatic blur signal/pattern than that which is indicative of hyperopia, as in FIG. 4.

In the embodiment shown in FIG. 5A, the chromatic distribution 110' is manipulated by the contact lens 112' such that red light (represented by "R") comes to focus closer to the retina than green light (represented by "G") which in turns comes to focus closer to the retina than blue light (represented by "B"). It should be appreciated that this results in a chromatic blur signal/pattern which is indicative of myopia, rather than hyperopia. This is because red light will appear more focussed than blue light, c.f. the myopic eye of FIG. 3B. Because of this, a so-called 'stop' signal will occur in the subject who is wearing the contact lens 112', owing to the presence of a chromatic blur signal which is characteristic of myopia. This is desirable, since it should slow down, or stop, the progression of myopia in a myopic subject wearing the contact lens 112' according to an embodiment of the disclosure.

Figure 5B:
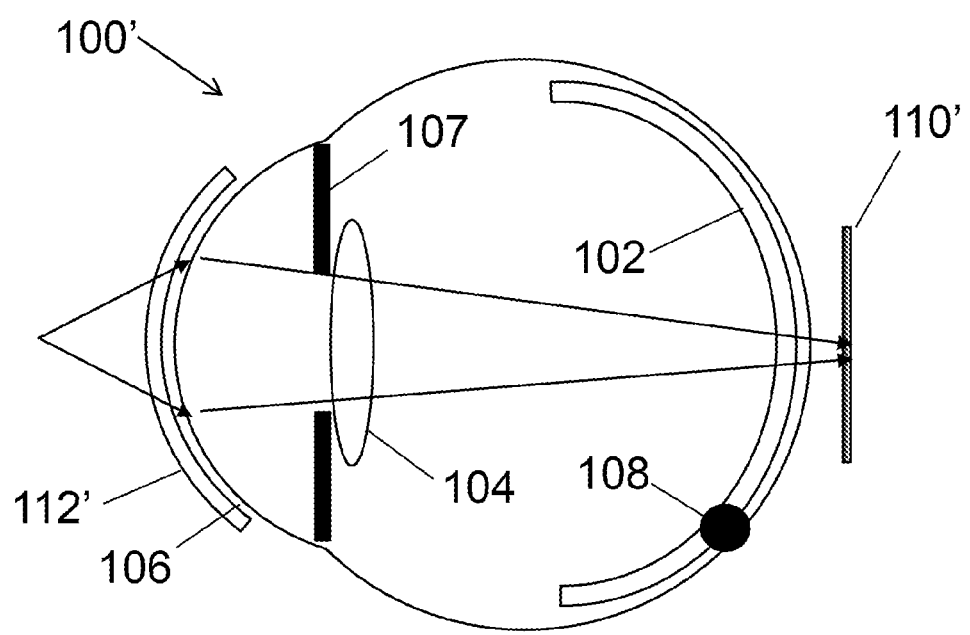
FIG. 5B is a schematic view of a myopic human eye wearing a contact lens for use in preventing or slowing the development or progression of myopia according to an embodiment of the present disclosure in which the contact lens has a diffractive optical element causing a cancellation of chromatic blur.

In the embodiment shown in FIG. 5B, the chromatic distribution 110' is manipulated by the contact lens 112' such that red light comes to focus substantially the same distance from the retina as both the green light and the blue light. It should be appreciated that this results in cancellation of the chromatic blur signal. This is because red light will appear as focussed as blue light. This scenario also generates a so-called 'stop' signal in the person wearing the contact lens 112', owing to the absence of a chromatic blur signal. This should slow down, or stop, the progression of myopia in a myopic subject wearing the contact lens 112'.

Contact lenses 112' for use in preventing or slowing the development or progression of myopia according to embodiments of the present disclosure comprise an optic zone for focusing light from distant point objects to a focal surface. The optic zone is shaped so as to form a diffractive optical element in the form of a diffractive lens. The diffractive lens manipulates the longitudinal chromatic aberration properties of the light proximate the focal surface. A diffractive lens (sometimes referred to as a Fresnel or phase Fresnel lens) is a type of lens which is composed of a series of zones that become finer towards the edge of the lens. Diffractive lenses are typically very thin elements with total depth height equal to $\lambda/(n-1)$, where $\lambda$ is the operating wavelength and n is the index of refraction.

In embodiments, the diffractive lens is configured to reduce the longitudinal chromatic aberration caused naturally by the human eye, i.e. in a manner such that the chromatic blur signal is reduced in magnitude. In other embodiments, the diffractive lens is configured to cancel the longitudinal chromatic aberration caused naturally by the human eye, i.e. in a manner such that there is effectively no chromatic blur signal/pattern. In other embodiments, the diffractive lens is configured to reverse the longitudinal chromatic aberration caused naturally by the human eye, i.e. in the manner shown schematically in FIG. 5 whereby the chromatic blur signal is manipulated by the contact lens to mimic that of a myopic defocus.

It should be appreciated that all three scenarios (reducing, cancelling or reversing of the longitudinal chromatic aberration caused naturally by the human eye) result in either a reduction of the grow signal or the introduction of a stop signal, all of which have the effect of slowing or preventing the progression of myopia in a subject wearing a contact lens 112' according to an embodiment of the present disclosure.

Figure 6:
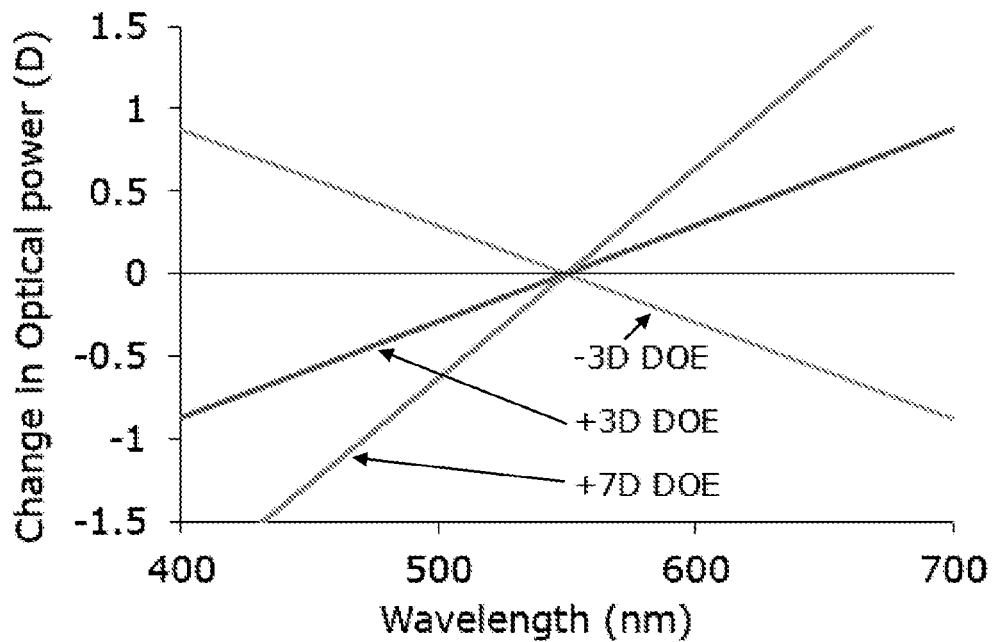
FIG. 6 is a graph showing calculations of the change in optical power as a function of wavelength for various diffractive lenses (diffractive optical elements) used in contact lenses according to embodiments of the present disclosure.
Figure 7:
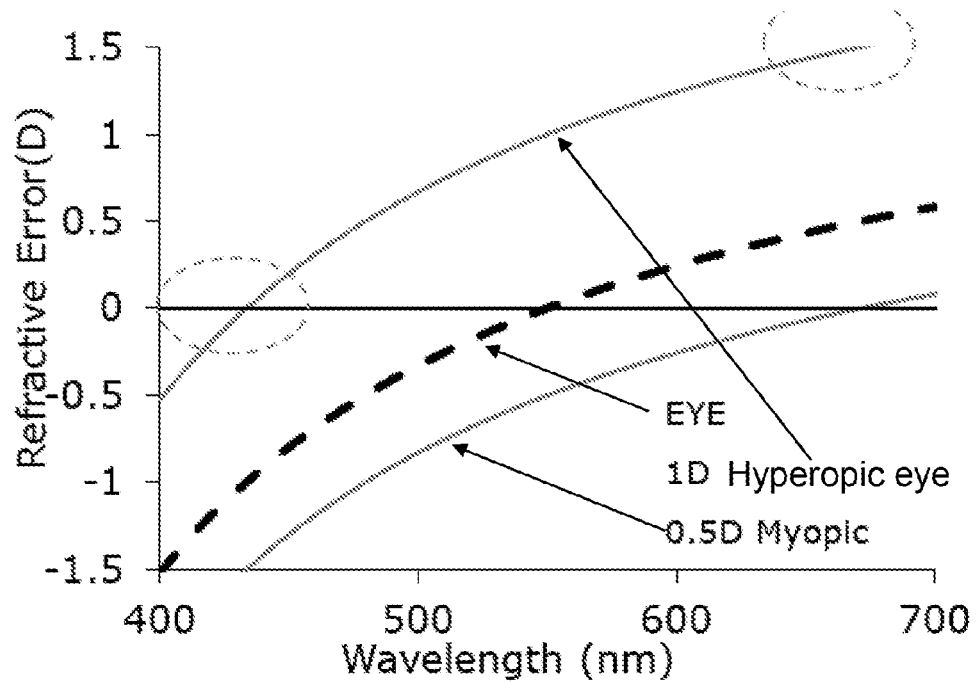
FIG. 7 is a graph showing refractive error as a function of wavelength for typical emmetropic, myopic and hyperopic eyes.

FIG. 6 is a graph showing calculations of the change in optical power as a function of wavelength for various diffractive lenses (i.e. diffractive optical elements or DOEs) of different optical powers and sign (−3 D, +3 D, and +7 D). With reference to FIG. 7, the emmetropic eye will experience a myopically blurred blue dominated image, while red images will have hyperopic blur (dashed ellipses). In contrast, a myopic eye will experience a good quality image of red and blurred blue, while a hyperopic eye will see the opposite (i.e. blue focused and red blurred).

Figure 8:
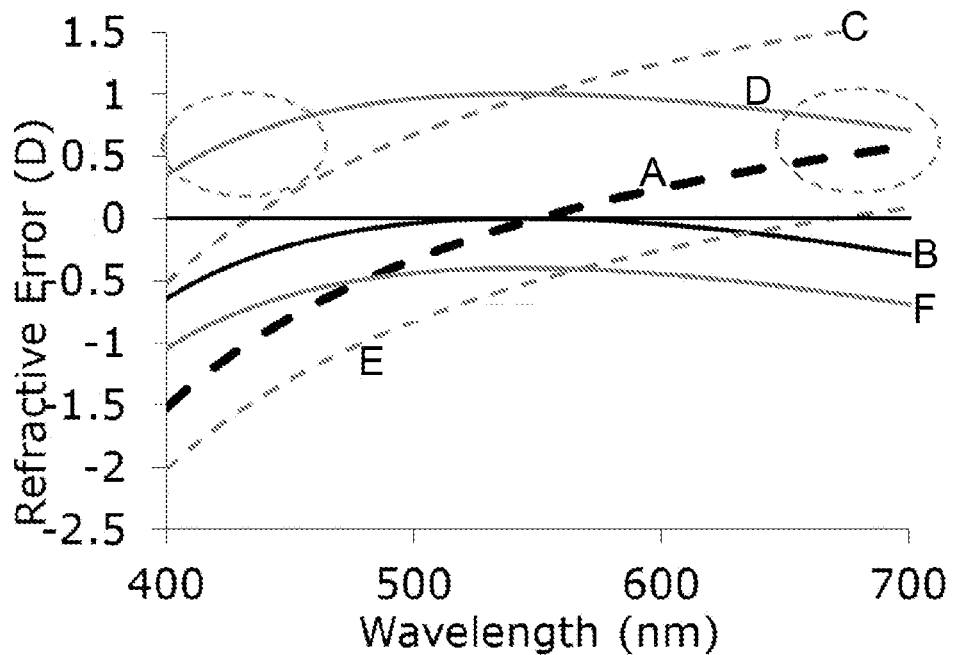
FIG. 8 is a graph showing calculations of refractive error as a function of wavelength when using a contact lens having a diffractive lens of power +3.2 D according to an embodiment of the disclosure in conjunction with typical emmetropic, myopic and hyperopic eyes.

Combining the teachings of FIG. 6 and FIG. 7, FIG. 8 is a graph showing calculations of refractive error as a function of wavelength when adding a diffractive lens of power +3.2 D to the eye. Line "A" corresponds to an emmetropic eye with no diffractive lens; line "B" corresponds to an emmetropic eye with the addition of a +3.2 D diffractive lens; line "C" corresponds to a hyperopic eye with no diffractive lens; line "D" corresponds to a hyperopic eye with the addition of a +3.2 D diffractive lens; line "E" corresponds to a myopic eye with no diffractive lens; and line "F" corresponds to a myopic eye with the addition of a +3.2 D diffractive lens. It should be noted that by adding a +3.2 D diffractive lens, the chromatic blur signal can be cancelled. This is evident by the fact that the red and blue blur (or defocussing) are approximately equal in magnitude (dashed ellipses), such that neither red light nor blue light appears more defocussed than the other. This reduces a chromatic grow signal. This is for the case of an emmetropic eye with accommodative lag or a hyperopically focussed eye with a reduced chromatic blur signal.

Figure 9:
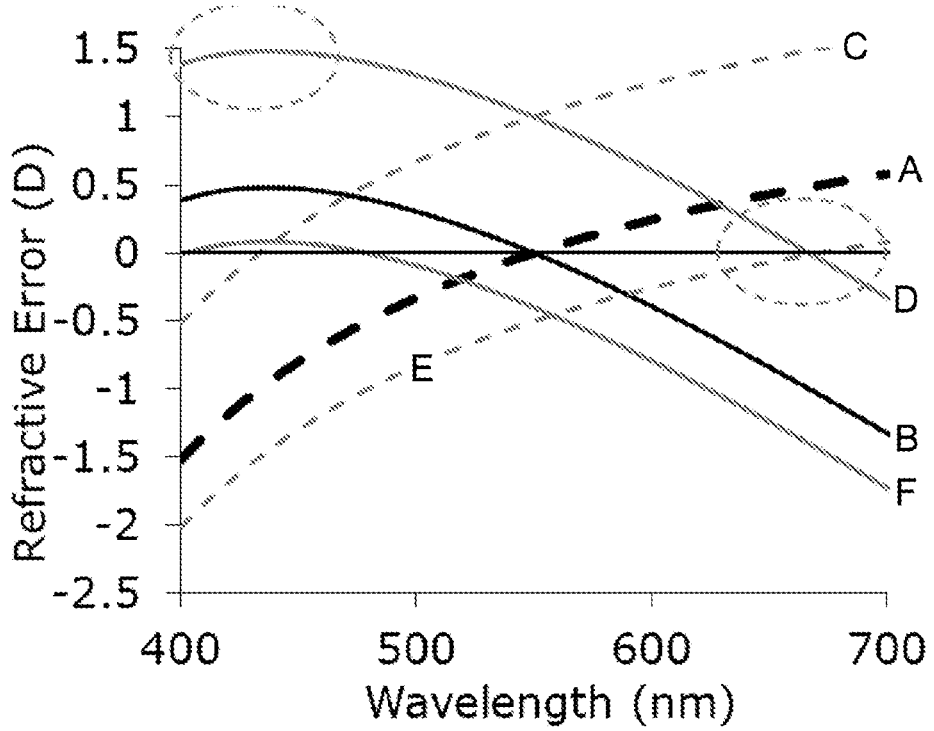
FIG. 9 is a graph showing calculations of refractive error as a function of wavelength when using a contact lens having a diffractive lens of power +7.0 D according to an embodiment of the disclosure in conjunction with typical emmetropic, myopic and hyperopic eyes.

FIG. 9 is a graph showing calculations of refractive error as a function of wavelength when adding a diffractive lens of power +7.0 D to the eye. Line "A" corresponds to an emmetropic eye with no diffractive lens; line "B" corresponds to an emmetropic eye with the addition of a +7.0 D diffractive lens; line "C" corresponds to a hyperopic eye with no diffractive lens; line "D" corresponds to a hyperopic eye with the addition of a +7.0 D diffractive lens; line "E" corresponds to a myopic eye with no diffractive lens; and line "F" corresponds to a myopic eye with the addition of a +7.0 D diffractive lens. It should be noted that by adding a +7.0 D diffractive lens, the chromatic blur signal can be reversed. In this manner, for the myopic eye under conditions of hyperopic defocus due to accommodative lag, with the +7.0 D diffractive lens, the chromatic blur signal is reminiscent of myopic defocus, as opposed to hyperopic defocus. Accordingly a stop signal for eye growth is generated, as opposed to a grow signal, as explained previously above. In other words, these calculations reveal that adding the higher power +7.0 D diffractive lens to the eye, the chromatic blur signal generated by hyperopia is reversed, making it similar to that typically created by myopia, i.e. red light focused and blue light defocused (dashed ellipses).

Figure 10A:
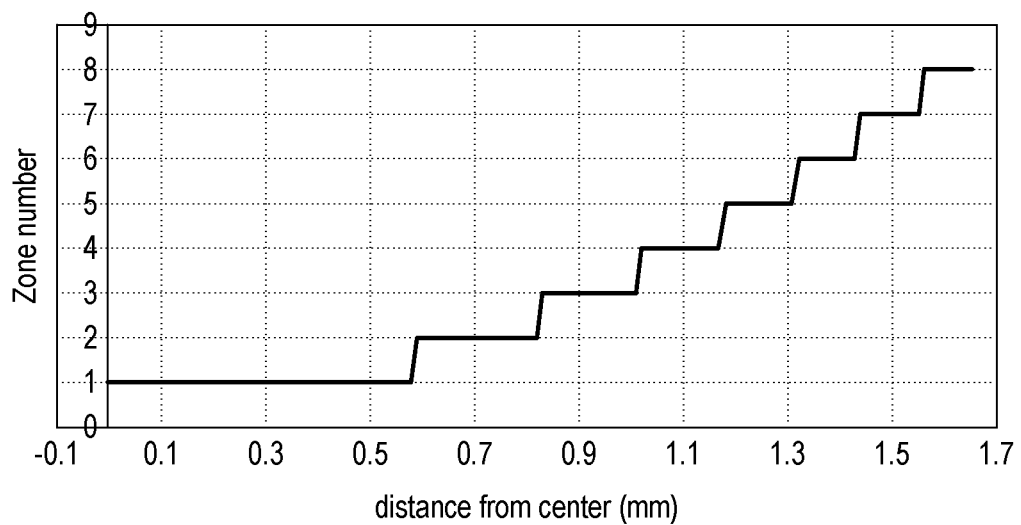
FIG. 10A shows the ring geometry for an example +3.2 D diffractive lens formed on a contact lens according to an embodiment of the present disclosure.
Figure 10B:
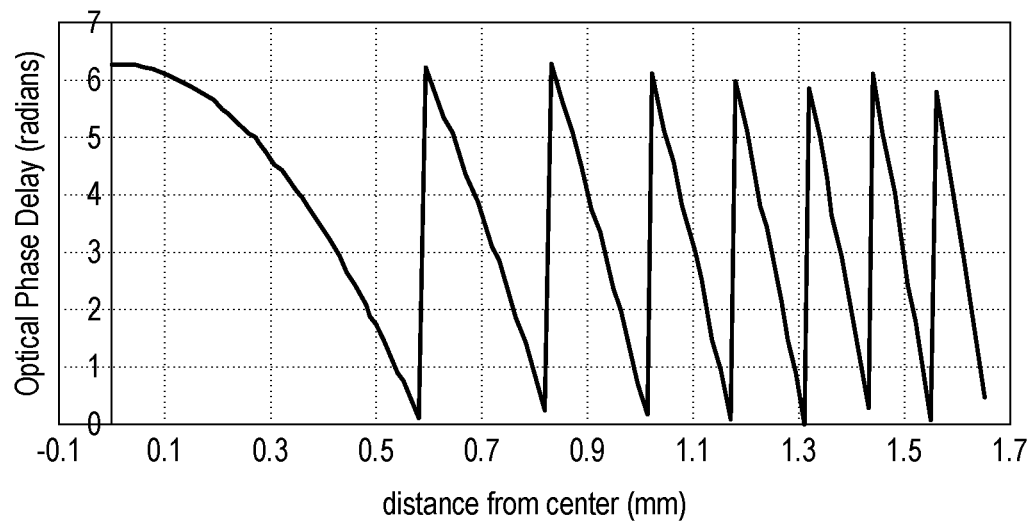
FIG. 10B shows the the optical phase changes produced by an example +3.2 D diffractive lens formed on a contact lens according to an embodiment of the present disclosure.
Figure 10C:
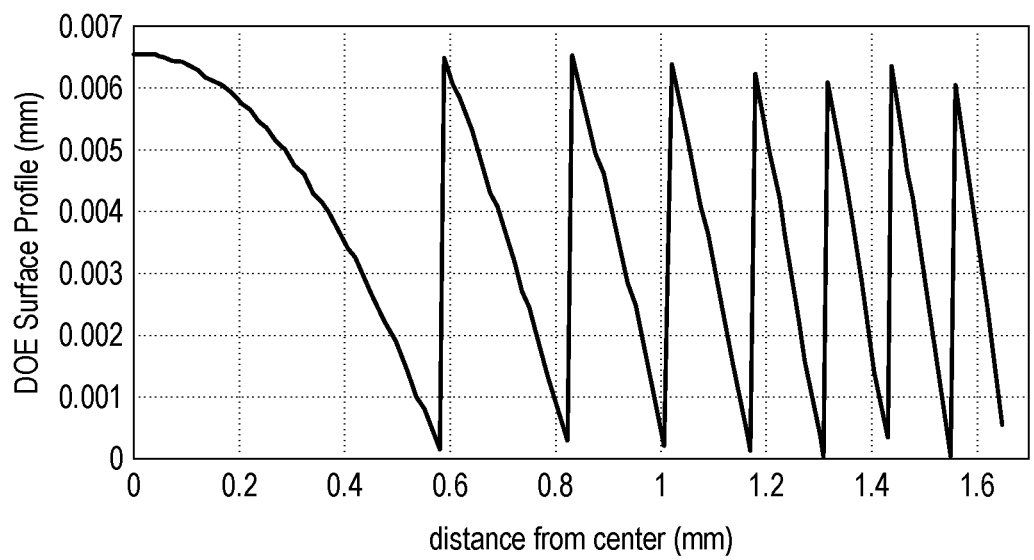
FIG. 10C shows the surface modulations for an example +3.2 D diffractive lens formed on a contact lens according to an embodiment of the present disclosure.
Figure 10D:
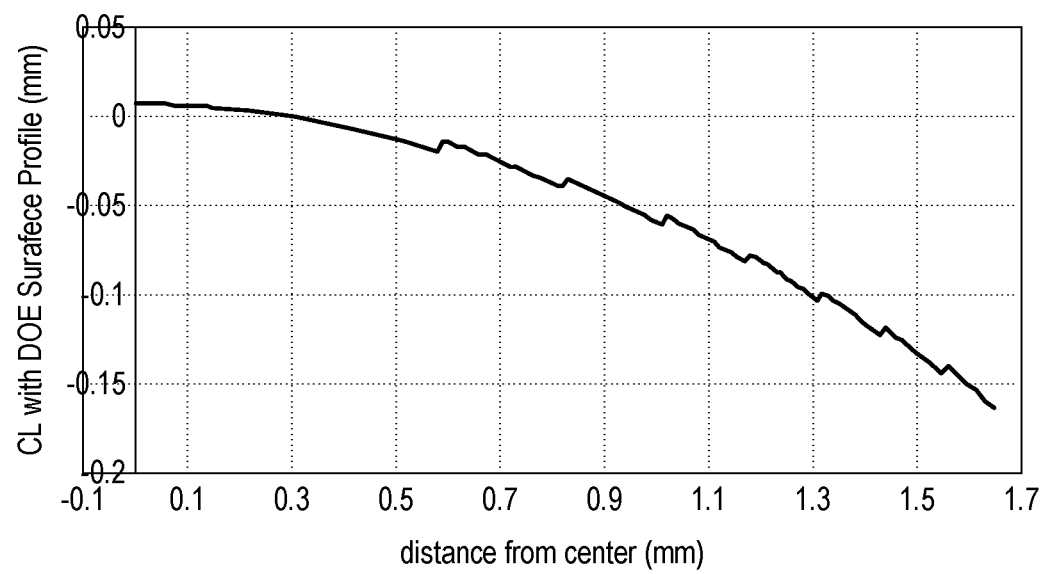
FIG. 10D shows the overall surface profile of a contact lens according to an embodiment of the present disclosure which includes the +3.2 D diffractive lens.

FIG. 10A, FIG. 10B, FIG. 10C and FIG. 10D show quantitative results for a sample +3.2 D diffractive lens according to an embodiment of the present disclosure. The lens has a refractive index of 1.42. FIG. 10A shows the ring geometry (the radial position of each successive ring). FIG. 10B shows the optical phase changes produced by the lens, which cycle between $2\pi$ radians and zero in each zone, as is generally required for a monofocal lens generated by the first diffraction order. FIG. 10C converts the phase to the required mm of surface modulations. This conversion is dependent upon the refractive indices of the lens and surrounding medium (1.42 and 1.336 in this example). FIG. 10D shows the surface profile when the diffractive lens is added to a standard contact lens with a radius of curvature of 8.4 mm. In general, the first diffractive order power of the diffractive lens can be increased by making the ring pattern smaller, or by increasing the phase steps from $2\pi$ to $4\pi$. Both the ring pattern size and the phase steps can be adjusted in this manner to increase the amount of longitudinal chromatic aberration caused by the diffractive lens, as required. The diffractive lens comprises a central zone surrounded by a plurality of concentric ring-shaped zones. In embodiments, the central zone has a diameter of between 1.0 mm and 1.4 mm. In embodiments, the optical phase across each zone of the diffractive lens varies over an interval of $2\pi$ radians. In embodiments, the width of each successive ring-shaped zone is less than the immediately preceding ring-shaped zone.

In embodiments, the diffractive lens has a negative optical power, as opposed to a positive optical power. Accordingly, in use (when worn on the eye) this results in added positive longitudinal chromatic aberration, as opposed to a reduction, cancellation or reversal of the longitudinal chromatic aberration. Such an elevation in longitudinal chromatic aberration may be beneficial for certain circumstances. For example, if sufficient positive longitudinal chromatic aberration is added, the blue and red spectral components may each become sufficiently blurred such that a grow signal is attenuated.

It should be appreciated that aspects of the present disclosure can be combined with aspects of prior art lenses for slowing the progressing of myopia. For example, in the prior art lens discussed with reference to FIG. 1 and FIG. 2, the central region 3 of the optic zone 2 may be adapted (profiled) to include a diffractive lens as disclosed herein, for manipulating the longitudinal chromatic aberration properties of the light proximate the focal surface. The annular region 3 of the optic zone 2 may be substantially unaltered. In this manner, a contact lens is obtained which generates myopia control signals via two separate mechanisms, viz.: through a chromatic blur stop signal in addition to the myopic defocus stop signal. It should be appreciated that the two stop signals are generally independent of each other.

Figure 11A:
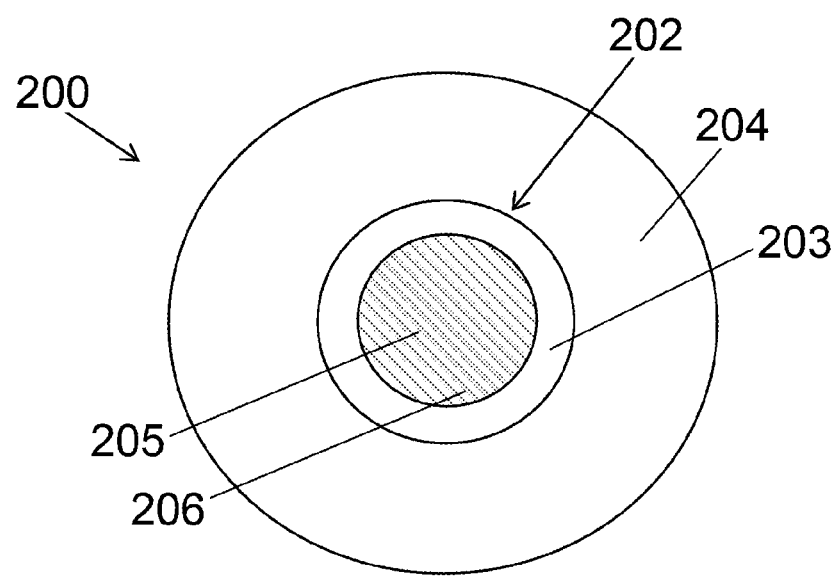
FIG. 11A is a schematic top view of a contact lens for use in the prevention of myopia according to embodiments of the present disclosure.
Figure 11B:
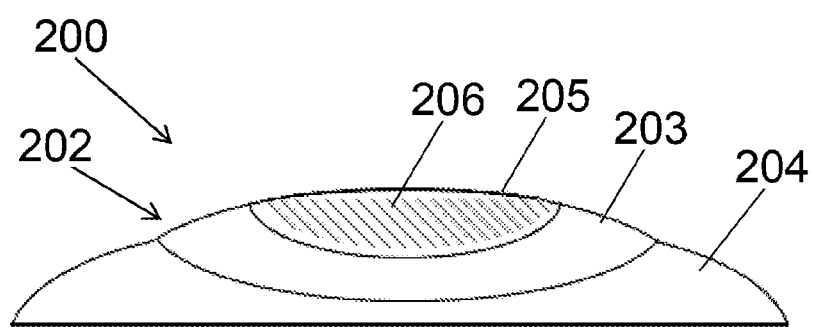
FIG. 11B is a schematic side view of the contact lens of FIG. 11A.

FIG. 11A and FIG. 11B illustrate schematically such a contact lens 200 according to embodiments of the present disclosure. The contact lens 200 comprises an optic zone 202, which approximately covers the pupil, and a peripheral zone 204 that sits over the iris. The peripheral zone 204 provides mechanical functions, including increasing the size of the lens thereby making the lens 200 easier to handle, optionally providing ballasting to prevent rotation of the lens 200, and providing a shaped region that improves comfort for the lens 200 wearer. The optic zone 202 provides the optical functionality of the lens 200, and the optic zone comprises an annular region 203 and a central region 205. The central region 205 comprises a diffractive lens 206 as disclosed herein, i.e. for manipulating the longitudinal chromatic aberration properties of the light. The annular region 203 has a greater optical power than the base power of the central region 205, such that the focus of the annular region lies on a proximal focal surface, and the focus of the central region lies on a distal focal surface, which is further away from the posterior surface of the contact lens 200 than the proximal focal surface. It should be appreciated that aspects described herein in relation to diffractive lenses for manipulating longitudinal chromatic aberration apply to the diffractive lens 206 of the contact lens 200.

As used herein, the term contact lens refers to an ophthalmic lens that can be placed on the eye of a person. It will be appreciated that such a contact lens will provide clinically acceptable on-eye movement and not bind to the eye or eyes of a person. The contact lens may be in the form of a corneal lens (e.g. a lens that rests on the cornea of the eye). The contact lens may be a soft contact lens, such as a hydrogel contact lens or a silicone hydrogel contact lens.

A contact lens according to the present disclosure comprises an optic zone. The optic zone encompasses parts of the lens that have optical functionality. The optic zone is configured to be positioned over the pupil of an eye when in use. The optic zone is surrounded by a peripheral zone. The peripheral zone is not part of the optic zone, but sits outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens.

A contact lens according to the present disclosure may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

By way of example, the lens may comprise a hydrogel or silicone hydrogel contact lens having a lens diameter of between 13 and 15 mm. The optic zone of the lens may have a diameter of between 7 and 9 mm.

The contact lens may be a molded contact lens. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. An ophthalmic lens for use in preventing or slowing the development or progression of myopia, the ophthalmic lens comprising an optic zone for focusing light from distant point objects to a focal surface,
   wherein the optic zone comprises a diffractive lens for manipulating the longitudinal chromatic aberration properties of the light proximate the focal surface,
   the optic zone comprises an annular region and a central region,
   the central region comprises said diffractive lens,
   the annular region has a greater optical power than the base power of the central region,
   the annular region does not comprise a diffractive lens for manipulating the longitudinal chromatic aberration properties of the light, and
   the diffractive lens is configured to reverse or increase the longitudinal chromatic aberration caused by the natural eye.

2. The ophthalmic lens according to claim 1, wherein the diffractive lens is configured to cancel the longitudinal chromatic aberration caused by the natural eye.

3. The ophthalmic lens according to claim 1, wherein the diffractive lens has a positive optical power.

4. The ophthalmic lens according to claim 1, wherein the diffractive lens has an optical power of between +2.0 dioptre and +8.0 dioptre.

5. The ophthalmic lens according to claim 1, wherein the diffractive lens has an optical power of between +3.0 dioptre and +3.4 dioptre.

6. The ophthalmic lens according to claim 1, wherein the optical power of the diffractive lens varies by at least 1.5 dioptre over a wavelength range of 400 nm to 700 nm.

7. The ophthalmic lens according to claim 1, wherein the diffractive lens has an optical power of between +6.8 dioptre and +7.2 dioptre.

8. The ophthalmic lens according to claim 1, wherein the optical power of the diffractive lens varies by at least 3.0 dioptre over a wavelength range of 400 nm to 700 nm.

9. The ophthalmic lens according to claim 1, wherein the diffractive lens comprises a central zone surrounded by a plurality of concentric ring-shaped zones.

10. The ophthalmic lens according to claim 9, wherein the central zone has a diameter of between 1.0 mm and 1.4 mm.

11. The ophthalmic lens according to claim 9, wherein the width of each successive ring-shaped zone is less than the immediately preceding ring-shaped zone.

12. The ophthalmic lens according to claim 1, wherein the ophthalmic lens is a contact lens.

13. The ophthalmic lens according to claim 12, wherein an optical phase across each zone of the diffractive lens varies over an interval of $2\pi$ radians.

14. The ophthalmic lens according to claim 1, wherein the ophthalmic lens is a contact lens and wherein the contact lens comprises an elastomer material, a silicone elastomer material, a hydrogel material, or a silicone hydrogel material, or mixtures thereof.

15. The ophthalmic lens according to claim 1, wherein the ophthalmic lens is a moulded contact lens.

16. The ophthalmic lens according to claim 1, wherein optic zone has a base optical power of between 0.5 dioptre and −15.0 dioptres.

17. The ophthalmic lens according to claim 1, wherein the focus of the annular region lies on a proximal focal surface, and the focus of the central region lies on a distal focal surface, which is further away from the posterior surface of the contact lens than the proximal focal surface.

18. The ophthalmic lens according to claim 1, wherein the focus of the annular region and the focus of the central region share a common optical axis.

19. The ophthalmic lens according to claim 1, wherein the ophthalmic lens is a contact lens and wherein the refractive index of the contact lens material is between 1.40 and 1.44.

20. A method of manufacturing the ophthalmic lens according to claim 1, the method comprising:
   forming a lens which comprises an optic zone for focusing light from distant point objects to a focal surface,
   wherein the optic zone comprises a diffractive lens for manipulating the longitudinal chromatic aberration properties of the light proximate the focal surface, the optic zone comprises an annular region and a central region, the central region comprises said diffractive lens, the annular region has a greater optical power than the base power of the central region, the annular region does not comprise a diffractive lens for manipulating the longitudinal chromatic aberration properties of the light, and the diffractive lens is configured to reverse or increase the longitudinal chromatic aberration caused by the natural eye.

21. A method of reducing progression of myopia, the method comprising: providing the ophthalmic lens according to claim 1 to a myopic person who is able to accommodate for varying near distances.

22. The method of claim 21, further comprising providing a plurality of the ophthalmic lenses to a myopic person who is able to accommodate for varying near distances, wherein the diffractive lenses of the plurality of ophthalmic lenses have differing optical powers, such that each ophthalmic lens causes a different longitudinal chromatic aberration manipulation.

\* \* \* \* \*